Figure 1:
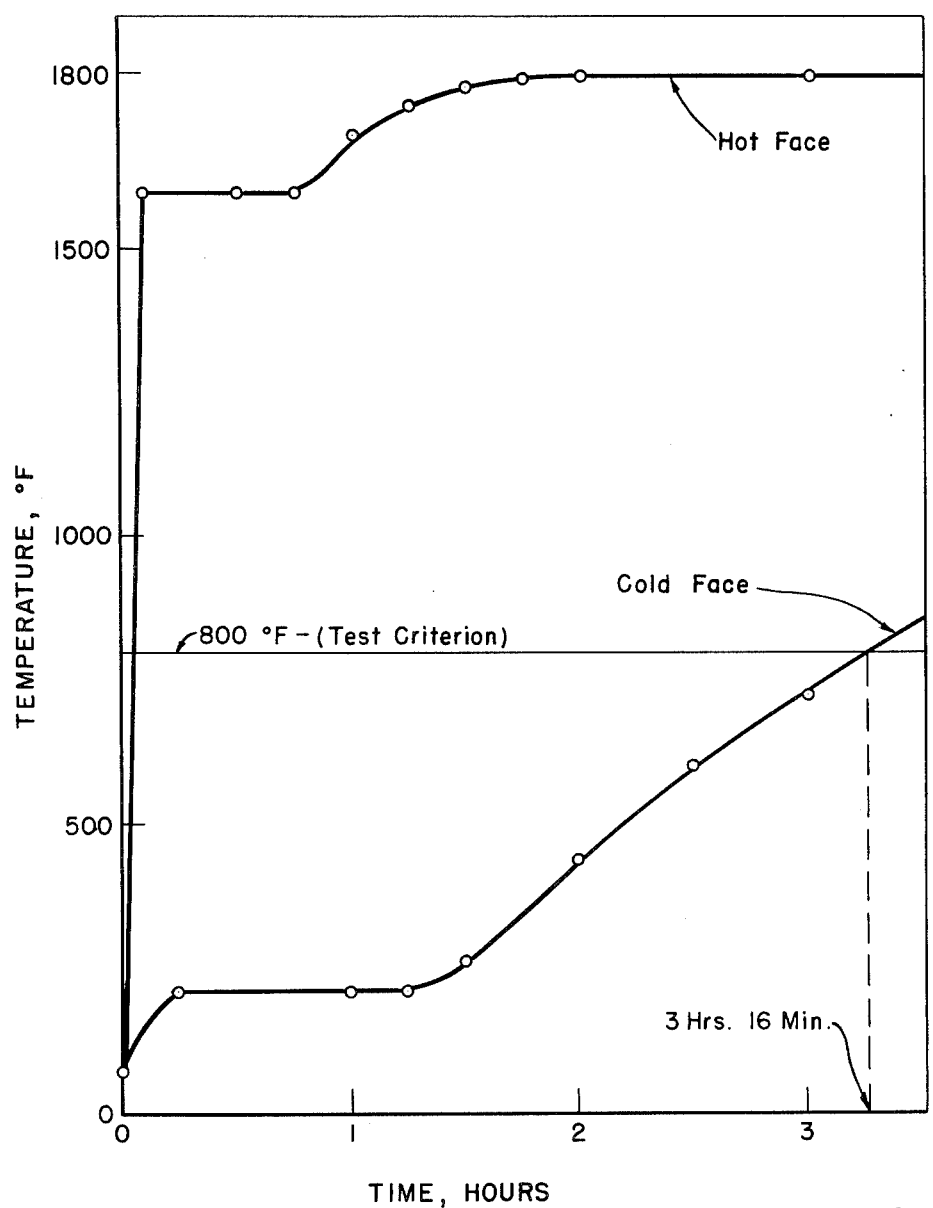

June 14, 1966   M. S. CROWLEY   3,255,973
SPRAYING APPARATUS

Original Filed Jan. 31, 1963   2 Sheets-Sheet 1

TIME-TEMPERATURE CURVES FOR FIRE RESISTANCE TEST OF 1-3/4"
ASPHALT-CEMENT-MINERAL WOOL INSULATION

INVENTOR.
Michael S. Crowley

June 14, 1966 M. S. CROWLEY 3,255,973
SPRAYING APPARATUS
Original Filed Jan. 31, 1963
2 Sheets-Sheet 2

INVENTOR.
Michael S. Crowley

United States Patent Office 3,255,973
Patented June 14, 1966

3,255,973
SPRAYING APPARATUS
Michael S. Crowley, Chicago Heights, Ill., assignor to Standard Oil Company, Chicago, Ill., a corporation of Indiana
Original application Jan. 31, 1963, Ser. No. 255,384. Divided and this application Dec. 7, 1964, Ser. No. 423,407
1 Claim. (Cl. 239—422)

This is a division of application Serial No. 255,384, filed January 31, 1963.

This invention relates to a sprayable fireproof insulating composition characterized by flexibility, ductility, weather resistance, and corrosion prevention of underlying metal surfaces.

An object of the invention is to provide a sprayable fireproofing and insulating composition for use with oil refinery and chemical processing vessels, structural members, vessel skirts, heat exchanger bonnets, and the like.

Another object is to provide a low-cost fireproofing and insulating composition for tanks, metal buildings, etc.

Yet another object is to provide an anti-condensate coating for buildings, cold water pipes, valves, and the like.

An important and especially valuable object is to provide a sprayable insulation for field stress relieving of processing vessels such as cat crackers.

Yet another object, and a more general one, is to provide a fireproofing composition having exceptional heat resistance.

A still further object is to provide a sprayable insulation having outstanding insulating properties.

A major object is to provide a sprayable fireproof insulating composition suitable for oil refinery and chemical processing plant use which can be applied easily and cheaply, remains permanently in position although it can be removed easily if desired, and which affords insulation as well as fire protective properties to the underlying surface.

An economic objective is to provide a sprayable fireproof insulating composition which can be applied rapidly, without the need for elaborate scaffolding or any but the simplest anchoring devices.

A special but important object is to provide a sprayable fireproof insulating composition which affords corrosion protection to underlying metal surfaces.

An overall object is to provide a sprayable fireproof insulating composition which is flexible, ductile, does not crack upon repeated heating and cooling of the vessel—even to a thousand degrees F. and higher—is weatherproof, lightweight, and strong and serviceable.

A special object is to provide a sprayable fireproof insulating composition for vessels, structural members, etc., which can be water-hosed during exposure to oil fires.

Other and more particular objects will become apparent as the description of this invention proceeds in detail.

A further object is to provide a method and apparatus for spraying the aforesaid fireproof insulating composition.

Briefly, in accordance with the invention, there is provided a sprayable fireproof insulating composition which is characterized by flexibility, ductility, weather resistance, and corrosion prevention of underlying surfaces, prepared from: (I) a dry mixture comprising (a) from about thirty to about seventy weight percent mineral wool, (b) from about ten to about twenty-five weight percent of Portland cement, (c) from zero to about twenty weight percent swelling bentonitic clay, and (d) from zero to about thirty weight percent asbestos fibers, and (II) an aqueous asphalt emulsion.

The inventive composition is applied by separately directing the foregoing dry mixture and the aqueous asphalt emulsion onto the surface to be protected. This is advantageously performed by air blowing the dry mixture, and by atomizing several streams of the aqueous asphalt emulsion, so that the dry mixture and emulsion are admixed prior to contacting the surface to be coated.

To effect mixing in the preferred manner, there is provided a nozzle for separately ejecting the air-blown dry stream or mixture therefrom, and for atomizing a plurality of liquid streams so that the liquid and dry mixture are admixed remote from the nozzle. The improved nozzle comprises a central conduit for ejecting the air blown dry stream, with a plurality of smaller conduits surrounding the central conduit. These smaller conduits direct a plurality of liquid streams in an intersecting path with the air blown dry stream. To atomize the several liquid streams, means are provided for injecting atomizing air at each of the liquid stream conduits.

Figure 2:
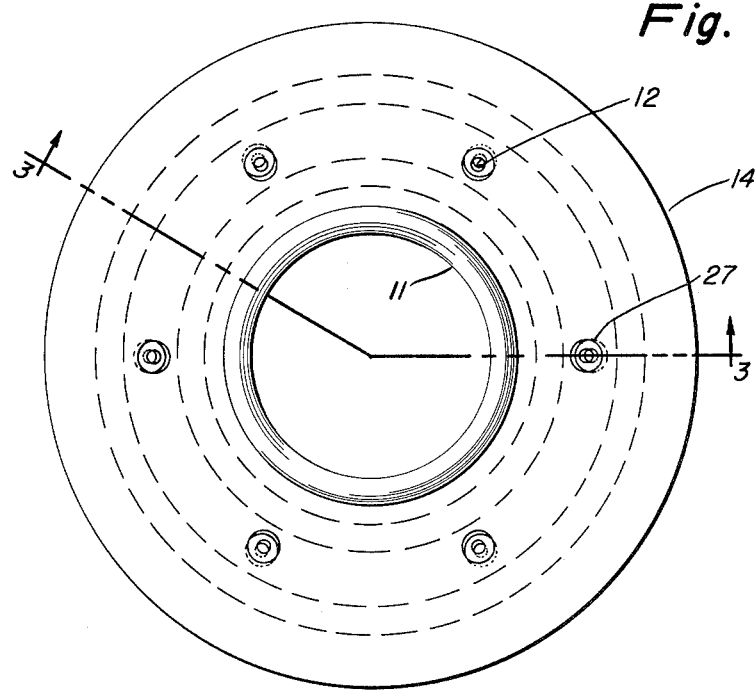
Figure 3:
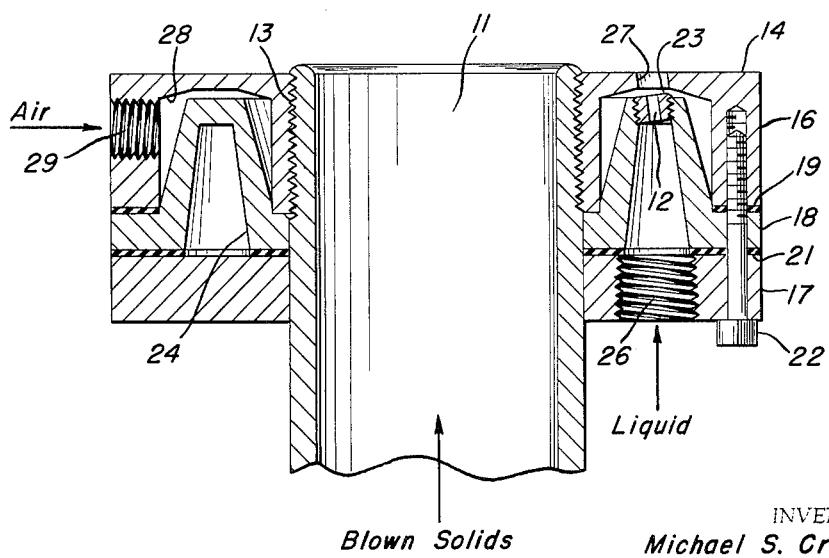

The invention will be described in more detail in conjunction with the attached drawings wherein:

FIGURE 1 depicts the time-temperature performance of the inventive fireproof insulating composition when a one and and three quarter inch layer of the composition is exposed to an 1800° F. atmosphere, FIGURE 2 depicts the end view of a nozzle which is especially effective for discharging the inventive fireproof insulating composition, and FIGURE 3 is a sectional view through plane 3—3 of FIGURE 2.

It has been found that the composition of the invention solves a long-standing problem in the oil refining and chemical processing industry, in that it enables the spray application of a low-cost insulating and fireproofing composition which is suitable either for temporary application or for long-term use. The unique combination of Portland cement to afford structural integrity during a fire, asphalt to provide water resistance and early binding action, and mineral wool for insulation, represents an ideal balance of properties which has demonstrated its utility through repeated laboratory and field tests.

As indicated earlier, the inventive composition comprises a dry mixture of several components and an aqueous asphalt emulsion, both of which are simultaneously sprayed onto the surface to be protected. The dry mixture is composed of from about thirty to about seventy weight percent mineral wool, from about ten to about twenty-five percent Portland cement, from zero to about thirty weight percent asbestos fibers, and from zero to about twenty percent of a swelling bentonitic clay.

The mineral wool constituent may be any of those commercially available materials prepared from blast furnace or equivalent slag, which has been blown into a fibrous mass. An example, and indeed exemplary, mineral wool is Johns-Manville's granulated "Rock Cork" mineral wool. While the proportion of mineral wool may vary from thirty to seventy percent, more or less, best results are found when it is in the range of about forty to about sixty weight percent of the dry mixture, e.g. fifty percent.

The second ingredient of the dry mix is Portland cement, most advantageously one of the type 3 Portlands, although type 1 has been found suitable. The cement concentration is suitably within the range of about ten to about twenty-five weight percent, optimally about fifteen-twenty-five percent, e.g. twenty percent.

Asbestos fibers are an optional ingredient of the composition, and provide an improved appearance at, however, some additional expense. If asbestos is employed, it is suitably used within the range of zero to about thirty percent, suitably about ten–twenty-five percent, e.g. twenty percent.

Another desirable ingredient is a swelling bentonitic clay, e.g. Volclay, or equivalent, used in a proportion of from about zero to about twenty weight percent of the dry mix, optimally from about five to about twenty weight percent, e.g. ten percent. The clay serves several purposes, primarily that of retaining loosely bound water for providing additional fire protection. Secondly, the clay acts as a drying agent, adsorbing water released as the asphalt emulsion breaks, and thus increasing the cohesion of the material. If, however, insulation rather than fire protection is the primary purpose for applying the inventive composition, then it may be desirable to minimize or even eliminate entirely the clay constituent.

While it is desired to maintain the dry mixture composition within the foregoing proportional ranges, a major advantage of the inventive composition is its controlled variability in relation to the desired use. If extra hardness is desired, the cement content may be increased. Other indications of controlled variability have been given previously, and a further variable is in the proportion of aqueous asphalt emulsion which is employed.

In addition to the dry mixture of mineral wool, cement, and optional asbestos and clay, the present fireproofing and insulating composition requires an asphalt emulsion in water. Asphalt provides early binding for the mineral wool and asbestos until the cement has had an opportunity to harden, and also affords weatherproofing of the final composition, as well as flexibility, ductility, corrosion protection of the underlying surface, and a certain measure of fireproofing. Rather surprisingly, although the composition of the invention contains substantial amounts of asphalt, and this asphalt will sustain combustion when external flame is applied, the composition is self-extinguishing, and meets all recognized tests of the self-extinguishing insulation.

The asphalt emulsion is a mixture of petroleum asphalt and water, together with an emulsifying agent such as clay or a soap. The preferred concentration of asphalt is in the range of about sixteen to about twenty-five weight percent based on total emulsion, although this can be from about ten to about thirty percent under special circumstances. The water serves the multiple function of rendering the asphalt sprayable and of hydrating the cement.

A suitable asphalt emulsion is Flintkote's N–13–HPC flooring emulsion, which is a fifty percent asphalt emulsion stabilized with clay. Soap-stabilized emulsions appear to work as well or better; the emulsion breaks faster and allows a second coat of the inventive composition to be applied more rapidly. An apparent drawback of soap emulsions is a somewhat disagreeable smell. On the other hand, clay-stabilized emulsions usually are more resistant to cracking and checking in outdoor exposure than soap-stabilized emulsions.

The proportion of dry mixture (mineral wool, cement, asbestos, and clay) to aqueous asphalt emulsion may be varied widely, and is usually controlled by the operator of the spray nozzle. In general, this proportion may range from one part by weight of dry mix to one of emulsion, to one part of dry mix to six of emulsion. It is usually preferred to commence spraying by directing a prime coat of straight asphalt emulsion onto the surface to be insulated, and thereafter commence introduction of the dry mix in the desired proportion. The composition may be finished off by terminating dry mix flow and coating with straight emulsion.

In order to test the present fireproof insulating composition, a quantity of the composition was prepared and sprayed onto different surfaces, as indicated. The composition consisted of one bag (about thirty pounds, or two cubic feet) of Johns-Manville "Rock Cord" mineral wool, six pounds of Type III Portland cement, six pounds of Volclay bentonite, and about fifteen gallons of twenty-five weight percent asphalt emulsion (Flintkote). The mineral wool, cement, and bentonite were air-ejected as a dry stream, and the asphalt emulsion was introduced into the stream in the form of a plurality of atomized streams in a manner to be described presently.

The sprayed composition had an average density of 65±5 pounds per cubic foot as sprayed, which was reduced to 35±5 pounds per cubic foot upon air drying. When fired to 1000° F., the average density was reduced to 18±3 pounds per cubic foot. This material was exceptionally strong; the modulus of rupture of air dried specimens was 50±5 pounds per square inch, and the compressive strength was 18±3 pounds per square inch at ten percent compression.

The thermal conductivity was exceptional. At a 75° F. mean temperature, the air dry insulation (density 39 pounds per cubic foot) had a thermal conductivity of 1.7±0.15 B.t.u. in./sq. ft. hr. F.; the material oven-dried at 220° F. (density 25 pounds per cubic foot) had a thermal conductivity of 1.3±0.16; and the 1000° F. fired material (density 15 pounds per cubic foot) had a thermal conductivity of 0.7±0.1.

To demonstrate the fire resistance of the inventive composition, a furnace was employed in which either of two doors could be used to close the furnace. One door was an ordinary furnace door, while the other was spray-coated with a one and three-quarter inch thickness of the composition described above. The furnace was heated to 1800° F. using the regular door, and the test specimen was then swung into the furnace by exchanging doors. Thermocouples recorded the hot face and cold face temperatures of the insulation; the test was ended when the cold face of the door reach 800° F.

FIGURE 1 shows the results of the fire resistance test. Inviting attention to the "Hot Face" curve, it is seen that the hot face remained at about 1600° F. for about one hour; this corresponds to the flame temperature of asphalt and represents the period during which asphalt was being distilled out of the fireproof insulation. After the hour period the temperature gradually increased to the 1800° F. temperature of the furnace interior.

The "Cold Face" curve at the bottom of FIGURE 1 illustrates the fireproofing effect of occluded and bound water by maintaining the cold face temperature at about 212° F. for about and one third hours. When all of the water had been removed, the cold face gradually increased in temperature, until the temperature was 800° F. in three hours and sixteen minutes. This is equivalent to a four hour ASTM fireproofing rating for a 1.53 inch layer of insulation.

In a second test employing a different furnace arrangement, a panel of insulation was heated to 1800° F. for three hours. A regulation fire hose was used to direct a hard stream of water against the heated surface at full pressure for sixty seconds from a distance of twenty feet. Many poor materials are washed off under this jet of water, while even a good fireproofing concrete usually suffers cracks and slight surface damage. However, the present composition exhibited Portland cement-vermiculite fireproofing concrete.

The composition of the invention is generally applied directly onto the surface to be insulated or fireproofed by either troweling or by gunning. For troweling, the mineral wool, cement, optional asbestos and clay, and asphalt emulsion are all mixed together, and then spread on in the usual manner. For the more advantageous gunning, it is best to separately direct the dry mix and the asphalt emulsion from a single nozzle apparatus in a manner such that both streams are mixed subsequent to leaving the nozzle but prior to contacting the surface.

A nozzle apparatus which is particularly effective for this purpose is shown in end view at FIGURE 2, and in cross section at FIGURE 3. Turning first to the end view, there is provided a central conduit 11 for ejecting a stream of dry mineral wool, cement, asbestos, and clay suspended in an air blast. Surrounding conduit 11 is a plurality of smaller, equally spaced conduits 12, through which the liquid asphalt emulsion is ejected. In the nozzle as shown, there are six equally spaced smaller conduits 12.

Turning momentarily to FIGURE 3, it is seen that central conduit 11 is a pipe or a similar structure which is screwed in via threads 13 to the nozzle body 14. Body 14 is composed of three parts; a top plate 16, a bottom plate 17, and a central plate 18. In addition, there are several gaskets, 19 and 21, cap screws 22, and replaceable nozzle tips 23.

Central plate 18 and bottom plate 17 together provide a trough-like annulus 24 for distributing the aqueous asphalt emulsion, which is introduced via threaded inlet port 26. This emulsion is ejected outward via holes 12 in replaceable nozzle tips 23, and passed through corresponding outlet ports or holes 27 in top plate 16.

Holes 12 in replaceable tips 23 are drilled at an angle so as to direct the ejected liquid stream generally toward the ejected air blown dry stream. A slant of 5°24' was used in an illustrative embodiment of the invention.

Since the ejected emulsion discharged via port 12 from annulus 24 will be a solid stream, it is necessary to atomize each of these streams prior to admixture with the air-blown dry stream. Atomization is preferably effected with air under pressure, although alternative procedures may be used. According to the optimum practice, atomizing air is injected immediately at the outlet of ports 10; this is effected by surrounding the trough-like annulus 24 defined by central plate 18 with another trough-like annulus 28, in top plate 16, and by providing top plate 16 with slanted ports 27 corresponding to ports 12.

In order to provide ease of control and operation of the nozzle, top plate 16, central plate 18, and bottom plate 17 are screwed together by cap screws 22. When removed, cap screws 22 permit exchanging replaceable nozzle tips 23 with tips of other size so as to control the quantity of emulsion ejected per unit time. To further facilitate operation, the three plates are separated by gaskets 19 and 21, and the air inlet onto annulus 28 is provided only into top plate 16, at threaded port 29.

In order to employ the inventive nozzle, a conventional insulation blower (GG54 Spraycoater, Wm. W. Meyer and Son, Inc., Skokie, Illinois), designed to mix the dry ingredients in its hopper and convey them through a 2½" flexible hose, is connected to inlet conduit 11 of the nozzle. An air-operated mobile pump (Number 225–837, Graco Pump) is connected into asphalt emulsion inlet port 26, while a source of compressed air is connected into port 29. Suitable valves are provided for the conduits leading into ports 26 and 29.

The emulsion blends with the dry ingredients about eighteen inches from the end of the nozzle. The gunning range can vary from about two feet to about fifteen feet, the optimum being about six feet for large surfaces.

In applying insulation with the nozzle described above, a film of asphalt emulsion is first sprayed onto the surface. Next, the insulation blower is started and the complete mixture is sprayed onto the asphalt-primed base. The material usually is applied in two layers, each about three-fourths inch thick. After the second layer is applied, a top coat of straight asphalt emulsion is sprayed over the surface to weatherproof the material and provide a water resistant cover. Production rates may vary from about 800 to about 1600 square feet per eight-hour day, for a one and one-half inch thickness applied in two coats to a large surface.

Thus it is apparent that the objectives and advantages of the invention have been achieved, and a fireproof insulating composition, as well as techniques for applying the same, has been provided which is exceptionally effective for insulating and fireproofing structural members, tanks, buildings, oil refinery vessels, vessel skirts, heat exchanger components, etc. In addition, it provides a simple means for producing a temporary or permanent insulating coating for field stress relieving of large vessels.

From the foregoing, it is seen that the composition of the invention possesses exceptional heat resistance, insulation properties, fireproofing, and hoseability. It is of low cost, and requires no elaborate scaffolding or expensive anchoring, and may be applied easily and rapidly. The material itself is weatherproof, flexible, ductile, crack-resistant upon heating and cooling, provides corrosion protection for underlying surfaces, and is sufficiently waterproof to be useful as an anti-condensate coating. Additionally, its properties of lightweight and strength may be varied by altering the proportions of ingredients.

While the invention has been described in combination with specific embodiments thereof, it is evident that these are for illustrative purposes only, and that many alternatives, modifications, and variations will be apparent to those skilled in the art in light of the foregoing description. Accordingly, it is intended to embrace all such alternatives, modifications, and variations as fall within the spirit and broad scope of the appended claim. As an alternative to all or part of the asphalt, a natural or synthetic rubber latex emulsion may be employed.

I claim:

A nozzle for separately ejecting a stream of dry particulate solids suspended in a carrier gas and a plurality of streams of an atomized liquid, and for effecting mixing of said streams remote from said nozzle whereby said solids are rendered adherent for application to surfaces, comprising in combination:

a central conduit for transporting and ejecting said stream of particulate solids; and a spray head surrounding said conduit and secured thereto adjacent the discharge end of said conduit, said spray head having conduit connecting means for separately supplying to said spray head liquid and air under pressure, said spray head comprising:

(1) a bottom section having a flat front face, a first transverse central opening therein shaped to receive said central conduit, and a second transverse opening extending from the front face to the rear face thereof for connection with said liquid conduit connecting means at the rear of said spray head;

(2) a top section having a flat front face, a transverse central opening therein shaped to receive said central conduit, a flat rear face wherein there is an annular chamber, a plurality of openings arranged around said central opening therein communicating between said annular chamber in said top section and the front face thereof, an axial opening in the side of said top section communicating with said annular chamber for connection with said air conduit connecting means at the side of said spray head;

(3) an intermediate section having a front face and a flat rear face wherein there is an annular chamber, and adapted to fit between said bottom section and said top section and to separate said annular chamber in said top section from said bottom section, a transverse central opening therein shaped to receive said central conduit; said annular chamber registering with said second transverse opening in said bottom section, said front face having a circumferential raised portion registering with said annular chamber in said rear face and adapted for extending into said annular portion of said top section, said raised portion having a plurality of transverse openings provided with spray nozzle means in the front face thereof communicating with said annular chamber of said intermediate section and the annular chamber of said top section, said transverse openings in said raised portion being equal in number and registering with said openings in said top section; and (4) means for securing said base, top and intermediate sections together in fluid-tight relationship.

References Cited by the Examiner

UNITED STATES PATENTS

| | | | |
|---|---|---|---|
| 2,433,463 | 11/1947 | Lampe | 239—422 |
| 2,578,412 | 11/1951 | Fisher | 239—428 |
| 2,585,133 | 2/1952 | Kempthhorne | 239—422 |
| 2,683,625 | 7/1954 | Fisher | 239—422 |
| 2,732,258 | 1/1956 | Fisher | 239—422 |
| 3,038,750 | 6/1962 | Nielsen | 239—422 |

M. HENSON WOOD, JR., *Primary Examiner.*

EVERETT W. KIRBY, *Examiner.*

R. S. STROBEL, *Assistant Examiner.*